US009569514B2

(12) United States Patent
Lu et al.

(10) Patent No.: US 9,569,514 B2
(45) Date of Patent: *Feb. 14, 2017

(54) STATEMENT-LEVEL AND PROCEDURAL-LEVEL REPLICATION

(71) Applicant: Oracle International Corporation, Redwood Shores, CA (US)

(72) Inventors: Edwina M. Lu, Palo Alto, CA (US); James W. Stamos, Saratoga, CA (US); Nimar S. Arora, Union City, CA (US); Lik Wong, Palo Alto, CA (US); Haobo Xu, Palo Alto, CA (US); Thuvan Hoang, San Mateo, CA (US); Byron Wang, Mountain View, CA (US); Lakshminarayanan Chidambaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 14/052,531

(22) Filed: Oct. 11, 2013

(65) Prior Publication Data
US 2014/0040203 A1    Feb. 6, 2014

Related U.S. Application Data

(63) Continuation of application No. 13/094,676, filed on Apr. 26, 2011, now Pat. No. 8,589,346.

(51) Int. Cl.
G06F 17/30    (2006.01)

(52) U.S. Cl.
CPC ... *G06F 17/30575* (2013.01); *G06F 17/30578* (2013.01)

(58) Field of Classification Search
CPC .................. G06F 17/30575; G06F 17/30578
See application file for complete search history.

(56) References Cited

U.S. PATENT DOCUMENTS 5,870,761 A      2/1999   Demers et al.
6,615,223 B1 *   9/2003   Shih .................. G06F 17/30575
                                                        707/625

(Continued)

OTHER PUBLICATIONS

U.S. Appl. No. 13/094,676, filed April 26, 2011, Office Action, Mar. 13, 2013.

(Continued)

*Primary Examiner* — Huawen A Peng
(74) *Attorney, Agent, or Firm* — Hickman Palermo Becker Bingham LLP; Daniel D. Ledesma

(57) ABSTRACT

Techniques for replicating data in database systems are described. In an example embodiment, a set of changes is received at a destination database, where the set of changes has been applied at a source database and is being replicated from the source database to the destination database. The set of changes is analyzed and it is determined that the set of changes includes two or more of: a subset of row-level changes, a subset of statement-level changes, and a subset of procedure-level changes. A set of dependencies is determined at least between the changes that are included in the subsets of changes. The changes, in the subsets of changes, are assigned to two or more processing elements. The set of changes is applied to the destination database by executing the two or more processing elements in parallel to each other and based on the set of dependencies.

22 Claims, 7 Drawing Sheets

(56) References Cited

U.S. PATENT DOCUMENTS

| | | | |
|---|---|---|---|
| 6,910,053 B1 * | 6/2005 | Pauly | G06F 17/30374 707/625 |
| 6,985,904 B1 * | 1/2006 | Kaluskar | G06F 17/30457 |
| 7,570,451 B2 | 8/2009 | Bedillion et al. | |
| 7,664,795 B2 * | 2/2010 | Balin | G06F 17/303 707/610 |
| 7,912,051 B1 | 3/2011 | Rowlands et al. | |
| 2004/0199552 A1 | 10/2004 | Ward et al. | |
| 2005/0021567 A1 * | 1/2005 | Holenstein | G06Q 10/087 |
| 2006/0010130 A1 | 1/2006 | Leff et al. | |
| 2006/0047713 A1 * | 3/2006 | Gornshtein | G06F 17/30575 |
| 2006/0200507 A1 * | 9/2006 | Holenstein | G06F 11/2048 |
| 2007/0143249 A1 * | 6/2007 | Bernal | G06F 17/30587 |
| 2008/0098044 A1 | 4/2008 | Todd | |
| 2010/0030730 A1 * | 2/2010 | Shang | G06F 17/30575 707/637 |

OTHER PUBLICATIONS

U.S. Appl. No. 13/094,676, filed Apr. 26, 2011, Notice of Allowance, Jul. 12, 2013.
U.S. Appl. No. 13/101,783, filed May 5, 2011, Notice of Allowance, Sep. 25, 2012.
U.S. Appl. No. 13/101,783, filed May 5, 2011, Notice of Allowance, Jan. 30, 2014.

* cited by examiner

| Field | Value |
| --- | --- |
| source_database_name | ORCL1 |
| command_type | UPDATE |
| object_owner | hr |
| object_name | employees |
| object_type | table |
| DDL_text | (null) |
| logon_user | thomas_t |
| current_schema | HR |
| tag | 0x00394120 |
| transaction_ID | 5.4.95831 |
| SCN | 110503730968 |
| commit_SCN | 110503730969 |
| PK_coulmn1_value | 127 |
| ... | ... |
| FK_column1_value | 1001 |
| ... | ... |
| constraint_column1_value | (null) |
| ... | ... |
| datatypes | number, varchar2, varchar2,... |
| old_values | 127, Debbie, Jones, ... |
| new_values | 127, Debbie, Smith, ... |
| ... | |

210 Example of Row-Level Change Record

*Fig. 2A*

| Field | Value |
|---|---|
| source_database_name | ORCL1 |
| command_type | UPDATE |
| object_owner | hr |
| object_name | jobs |
| object_type | table |
| SQL_text | update hr.jobs set min_salary = 1.05 * min_salary where job_title <> @var1 |
| logon_user | thomas_t |
| current_schema | HR |
| tag | 0x00494889 |
| transaction_ID | 6.1.77210 |
| initial_SCN | 110503731053 |
| commit_SCN | 110503731055 |
| modified_objects | hr.jobs |
| bind_values | @var1, varchar2, 'manager' |
| predicate_information | job_title <> 'manager' |
| old_values_checksum | 0x78013346 |
| rowcount | 334 |
| ... | ... |

220 Example of Statement-Level Change Record

*Fig. 2B*

| Field | Value |
|---|---|
| source_database_name | ORCL1 |
| command_type | EXECUTE |
| procedure_owner | hr |
| package_name | (null) |
| procedure_name | add_job_history |
| parameter1 | p_emp_id |
| parameter1_value | 101 |
| ... | ... |
| SQL_text | execute hr.add_job_history (101, '3/18/1997','02/11/2010','clerk', 230) |
| logon_user | thomas_t |
| current_schema | HR |
| tag | 0x01735549 |
| transaction_ID | 6.4.01378 |
| initial_SCN | 110503732106 |
| commit_SCN | 110503732110 |
| modified_objects | hr.job_history |
| bind_values | (null) |
| ... | ... |

230 Example of Procedure-Level Change Record

*Fig. 2C*

STATEMENT-LEVEL AND PROCEDURAL-LEVEL REPLICATION

CROSS-REFERENCE TO RELATED APPLICATIONS; BENEFIT CLAIM

This application is a Continuation of U.S. patent application Ser. No. 13/094,676, filed Apr. 26, 2011, the entire contents of which are hereby incorporated by reference for all purposes as if fully set forth herein. The Applicant hereby rescinds any disclaimer of claim scope in the parent application or the prosecution history thereof and advises the USPTO that the claims in this application may be broader than any claim in the parent application.

The present application is related to U.S. patent application Ser. No. 13/101,783 filed May 5, 2011 entitled "USER-DEFINED PARALLELIZATION IN TRANSACTIONAL REPLICATION OF IN-MEMORY DATABASE" by Sourav Ghosh et al., the entire contents of which is hereby incorporated by reference as if fully set forth herein.

The present application is related to U.S. patent application Ser. No. 10/260,547 filed on Oct. 1, 2002, now U.S. Pat. No. 6,980,988 issued on Oct. 1, 2002 entitled "METHOD OF APPLYING CHANGES TO A STANDBY DATABASE SYSTEM" by Alan J. Demers et al., the entire contents of which is hereby incorporated by reference as if fully set forth herein.

The present application is related to U.S. patent application Ser. No. 10/120,634, filed on Apr. 10, 2002, now U.S. Pat. No. 7,406,486 issued on Jul. 29, 2008 entitled "TRANSFORMING TRANSACTIONS TO INCREASE PARALLELISM WHEN REPLICATING" by Joydip Kundu et al., the entire contents of which is hereby incorporated by reference as if fully set forth herein.

TECHNICAL FIELD

The present disclosure relates to replication in database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database replication is a mechanism for creation and maintenance of multiple copies (or replicas) of the same data in multiple databases. For example, a set of data and/or database objects from a source database is created in a destination database, and thereafter any changes made to the data and/or the database objects in the source database are propagated to and applied in the destination database. Based on how changes are tracked, several different types of replication can be used to replicate changes from a source database to a destination database.

Row-level replication is used to replicate changes at the data row level. In row-level replication, the changes are tracked as individual modifications to data rows in the source database and are applied as individual modifications to corresponding data rows in the destination database. For example, if 1000 data rows of a given table are updated at the source database, then 1000 separate updates are propagated and applied to 1000 data rows in the corresponding table in the destination database.

Statement-level replication is used to replicate changes at the database statement level. In statement-level replication, at the source database the changes are tracked as entire database statements, which statements are then replicated and executed at the destination database. For example, if a database statement updated 1000 data rows of a given table at the source database, then the database statement itself is replicated and executed at the destination database in order to update the corresponding table at the destination database.

Procedure-level replication is used to replicate changes at the stored procedure level. Procedure-level replication tracks calls to stored procedures at the source database, replicates to the destination database the procedure calls with their parameters, and causes execution of the corresponding stored procedures at the destination database based on the replicated procedure calls and the parameters thereof. Procedure-level replication is useful for replicating a procedure call, rather than the changes made to individual data rows by the called stored procedure, in operational scenarios where row-level replication may not produce equivalent results in the destination database because of various reasons such as different row identifiers, different version or implementation of the stored procedure, etc.

Typically, the replication latency in propagating and applying changes to a destination database is reduced when a combination of row-level replication, statement-level replication, and procedure-level replication is used to replicate the changes. One reason for this is that each type of replication improves replication performance in a different way, and so using a combination of the different types of replication for different types of changes yields a better overall performance than using only a single type of replication for all of the different types of changes. Further, in typical operational scenarios, a source database is configured to accept multiple sessions that can include a large number of connections over which database applications and clients can concurrently execute multiple transactions that make different types of changes to the data and data objects in the database.

However, when changes made by multiple transactions in a source database are replicated, significant replication latency can result because the typical replication mechanisms do not allow parallel application to a destination database of changes that have been replicated by using a combination of row-level replication, statement-level replication, and procedure-level replication. For example, suppose that two transactions need to be replicated from the source database to the destination database and each of the two transactions makes row-level, statement-level, and procedure-level changes to the source database. In this scenario, the typical replication mechanisms can only apply these changes to the destination database as a single thread or process even though at the source database the two transactions are executed concurrently and therefore their changes are applied to the source database in parallel.

BRIEF DESCRIPTION OF THE DRAWINGS

The techniques described herein are illustrated by way of example, and not by way of limitation, in the figures of the accompanying drawings and in which like reference numerals refer to similar elements and in which:

FIG. 2A is a block diagram that illustrates an example row-level change record according to one embodiment;

FIG. 2B is a block diagram that illustrates an example statement-level change record according to one embodiment;

FIG. 2C is a block diagram that illustrates an example procedure-level change record according to one embodiment;

DETAILED DESCRIPTION

Figure 1:
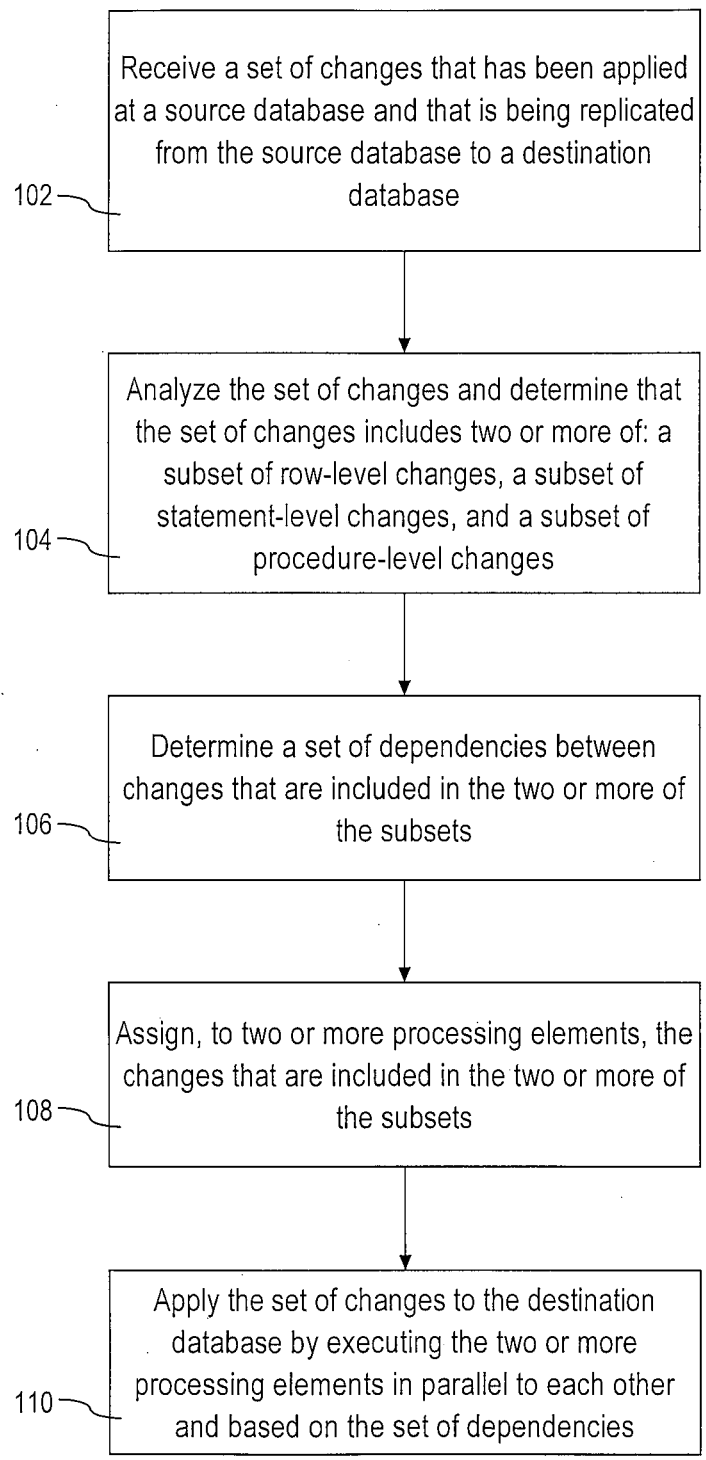
FIG. 1 is a flow diagram that illustrates an example method for applying replication changes according to one embodiment.

In the following description, for the purposes of explanation, numerous specific details are set forth in order to provide a thorough understanding of the described techniques for database replication. It will be apparent, however, that the techniques described herein may be practiced without these specific details. In other instances, well-known structures and devices are shown in block diagram form in order to avoid unnecessarily obscuring the techniques described herein.

General Overview

The techniques for database replication described herein provide the ability to apply a combination of row-level, statement-level, and procedure-level changes to a destination database in parallel. To facilitate the parallel application of a combination of different types of changes, the techniques described herein provide for computing dependencies among the different types of changes at following levels: data row level (e.g., based on primary key column values, foreign key constraints, unique constraints, etc.); predicate level (e.g., based on information included in the predicates of database statements); object level (e.g., based on object identifiers); schema level (e.g., based on schema identifiers); and database level (e.g., based on system control numbers that indicate the order in which changes are applied at a source database).

The techniques described herein also provide for conflict detection for statement-level changes during the process of applying these changes to a destination database. The conflict detection mechanisms described herein are used to determine whether applying a statement-level change to a destination database will produce a result that is logically equivalent to the result produced by the same statement-level change at the source database. If applying the statement-level change to the destination database would produce a result that is not equivalent to the result in the source database, a conflict is detected and the statement-level change is not applied to the destination database until the conflict is resolved.

The techniques described herein also provide for using statement-level and procedure level changes to provide replication for new database features that are supported by the source database system and the destination database system, but are not supported by the replication engine components that replicate changes related to the new database features from the source database system to the destination database system.

In an example embodiment of the techniques described herein, a set of changes has been applied at a source database and is being replicated to a destination database. The set of changes is analyzed, and a determination is made that the set of changes includes two or more of: a subset of row-level changes, where each row-level change affects an individual data row; a subset of statement-level changes, where each statement-level change affects multiple data rows; and a subset of procedure-level changes, where each procedure-level change includes a stored procedure call. A set of dependencies is determined between those changes that are included in the two or more of the subset of row-level changes, the subset of statement-level changes, and the subset of procedure-level changes. The changes included in the two or more subsets are assigned to two or more processing elements. The set of changes received from the source database is then applied to the destination database by executing the two or more processing elements in parallel to each other and based on the determined set of dependencies.

In another example embodiment of the techniques described herein, a set of changes is being synchronously replicated from a source database to a destination database. The set of changes is analyzed, and a determination is made that the set of changes includes a subset of statement-level changes and one or more of a subset of row-level changes and a subset of procedure-level changes. The changes included in the subset of statement-level changes and in the one or more of the subset of row-level changes and procedure-level changes are assigned to two or more processing elements. The set of changes received from the source database is then applied to the destination database by executing the two or more processing elements in parallel to each other, where applying the set of changes comprises detecting whether one or more replication conflicts exist for changes in the subset of statement-level changes.

In various embodiments, the techniques described herein may be implemented as one or more methods that are performed by one or more computing devices, as a computer program product in the form of sequences of executable instructions that are stored on one or more computer-readable storage media, and/or as one or more systems that are configured to perform the described techniques.

Functional Description of an Example Embodiment

FIG. 1 is a flow diagram that illustrates an example method for applying replication changes in accordance with the techniques described herein. The method illustrated in FIG. 1 is described hereinafter as being performed by one or more replication engine components that are configured to apply changes to a destination database. However, it is noted that this description is for illustrative purposes only and the method of FIG. 1 is not limited to being performed by any particular type of component, process, or service.

In step 102, one or more replication components associated with a destination database receive a set of changes that are being replicated from a source database. As used herein, "database" refers to a collection of data that is stored on one or more persistent storage devices. "Destination database" (or "target database") refers to a database to which changes are being replicated, and "source database" refers to a database from which changes are being replicated. "Change" refers to one or more records that store information which indicates a particular modification to a source database, where the particular modification may be to data stored in a database object, to the structure of a database object, to the structure of a schema, and/or to the structure or state of the source database itself.

In step 104, the replication component(s) associated with the destination database analyze the set of changes received from the source database, and determine that the set of changes includes a combination of two or more of: a subset of row-level changes, a subset of statement-level changes, and a subset of procedure-level changes. As used herein, "row-level" change refers to a change that affects one or more data values in an individual data row. "Statement-level" change refers to a change that affects data values in multiple data rows. "Procedure-level" change refers to a change that includes a call to a stored procedure.

In step 106, the replication component(s) associated with the destination database determine a set of dependencies between at least the changes that are included in the two or more subsets of row-level, statement-level, and procedure-level changes in the set of changes that is received from the source database. As used herein "dependency" refers to information which indicates that a particular change is to be applied to the destination database after another change, of the set of changes, has already been applied and committed to the destination database. In some embodiments, a dependency may also include information about the relationship(s) between the database transactions, at the source database, to which the set of changes belong. According to the techniques described herein, a change may be associated with one or more dependencies, and the dependencies associated with a particular change need to be satisfied before the particular change is applied to the destination database.

In step 108, the replication component(s) associated with the destination database assign to two or more processing elements at least the changes that are included in the two or more subsets of row-level, statement-level, and procedure-level changes in the set of changes that is received from the source database. As used herein, "processing element" refers to an operational entity (e.g., such as a computer process or thread) that is assigned computational resources (e.g., such as memory, CPU time, etc.) on one or more computing devices and is configured to execute a set of operations against a database. For example, the replication component(s) associated with the destination database may assemble two or more database transactions from the set of changes received from the source database, and may assign the two or more transactions to two or more background processes that are configured to execute the two or more transactions against the destination database. (As used herein, "database transaction" or simply "transaction" refers to a logical unit of one or more database operations that either are all completed in their entirety or are all rolled back and do not take effect.)

In step 110, the replication component(s) associated with the destination database apply the set of changes to the destination database by causing the two or more processing elements to execute in parallel to each other and based on the determined set of dependencies. As used herein, "applying" a change refers to executing and/or otherwise performing the operation(s) indicated in the change. For example, applying a procedure-level change may include making a call to a stored procedure based on parameter values that are indicated in the change. In another example, applying a statement-level change may include executing a database statement, such as a Structured Query Language (SQL) query, against a database. In another example, applying a row-level change may include executing an operation that modifies a data value within a data row of a particular database object.

According to the techniques described herein, the two or more processing elements, to which the set of received changes is assigned, are executed in parallel based on the set of dependencies determined for the set of changes. For example, prior to executing each particular change, a processing element first checks whether the dependencies associated with the particular change have been satisfied. If the one or more dependencies for the particular change are not satisfied (e.g., if there is another change, on which the particular change depends, that has not yet been applied and/or the transaction, in which the other change is included, has not yet been committed to the destination database), then the processing element suspends execution and does not apply the particular change to the destination database until all dependencies for the particular change have been satisfied (e.g., until all other changes, on which the particular change depends, have been successfully applied and the transactions, in which these other changes are included, have been committed to the destination database). In this manner, the techniques described herein ensure that the multiple processing elements, to which the set of received changes are assigned, can execute in parallel against the destination database, thereby improving the replication latency even when the set of received changes includes a combination of row-level, statement-level, and procedure-level changes.

Examples of Change Records and Change Record Types

According to the techniques described herein, a change is comprised of one more records that store information which indicates that a particular modification has been made to a source database. The particular modification may include, without limitation: update, delete, or insert of a particular data in a database object of the source database; creation or deletion of a database object in a particular schema of the source database; modification of one or more operational parameters of the source database; and any other type of operation that modifies data, database object(s), database schema(s), and/or the operational state of the source database. The database objects (sometimes also referred to as "schema objects") that store data in a database (e.g., such as a relational or object-relational database) may include, but are not limited to, tables, views, sequences, stored procedures, indexes, clusters, and database links to other databases.

Row-Level Change Records

According to the techniques described herein, a row-level change record indicates an operation that affects an individual data row. "Data row" refers to a storage structure that is configured for storing (on a persistent storage device and/or in volatile memory) one or more values that correspond to one or more columns of a database object such as, for example, a table, an index, or a materialized view. For example, in a database table that stores employee data in three columns named "employee_ID", "first_name", and "last_name", a particular data row can store values for an employee ID, a first name, and a last name for a particular employee. Thus, one example of a row-level change record would be a record that indicates an update operation that modifies the value in the "last_name" column for a particular employee from "Jones" to "Smith". Another example of a row-level change record would be a record that indicates an insert operation that inserts an employee ID, first name, and a last name of a new employee in the database table, and yet another example of row-level change record would be a record that indicates a delete operation that deletes the data row which stores the values for a particular employee.

FIG. 2A is a block diagram that illustrates an example of a row-level change record according to one embodiment. It is noted that in different embodiments and implementations, a row-level change may comprise of multiple records that store information indicating a single modification to a single data row. Thus, the single row-level change record 210 for a single modification in FIG. 2A is to be regarded in an illustrative rather than a restrictive sense.

In FIG. 2A, row-level change record 210 is a data structure that stores data values in several fields. The data values in record 210 indicate an update operation that modifies the "last_name" column for a particular data row in the "employees" table (in schema "HR" of database "ORCL1") from "Jones" to "Smith".

As illustrated in FIG. 2A, row-level change record 210 stores information about an update row-level change in the following fields:

source_database_name: this field is configured for storing a value that identifies the source database;

command_type: this field is configured for storing a value that identifies the type of the command that is executed in the source database, where examples of command types include, without limitation, insert, update, delete, create, alter, drop, rename, etc.;

object_owner: this field is configured for storing a value that identifies the user who owns the database object against which the row-level change is applied;

object_name: this field is configured for storing a value that identifies the database object against which the row-level change is applied;

object_type: this field is configured for storing a value that identifies the type of the database object against which the row-level change is applied;

DDL_text: when the row-level change is related to creating or modifying a database object or the source database itself, this field is configured for storing the text of a data definition language (DDL) statement that creates or alters the structure of the database object or the source database;

logon_user: this field is configured for storing a value that identifies the user whose database session initiated the row-level change;

current_schema: this field is configured for storing a value that identifies the schema, in the source database, that stores the database object against which the row-level change is applied;

tag: this field is configured for storing a value that identifies the change record itself and that is used to track the propagation of the change record to the destination database;

transaction_ID: this field is configured for storing a value that identifies the database transaction within which the row-level change was applied in the source database;

SCN: this field is configured for storing a system-wide control number that indicates the state of the source database at the time when the row-level change was initiated;

commit_SCN: this field is configured for storing a system-wide control number that indicates the state of the source database at the time when the row-level change was committed to persistent storage;

PK_column1_value: this field is configured for storing the value in a primary key column of the data row, which was modified by the row-level change in the source database, and this value is used to identify the corresponding data row in the destination database; it is noted that when the primary key of the affected database object spans multiple columns, a row-level change record may include multiple such fields or multiple related records may be used to store the values of the multiple primary key columns for the modified data row;

FK_column1_value: this field is configured for storing the value in a foreign key column of the data row which was modified by the row-level change; it is noted that when the affected database object includes multiple foreign key columns, a row-level change record may include multiple such fields or multiple related records may be used to store the values of the multiple foreign key columns for the modified data row;

constraint_column1_value: this field is configured for storing the value in a unique constraint column of the data row which was modified by the row-level change; it is noted that when the database object includes multiple unique constraint columns, a row-level change record may include multiple such fields or multiple related records may be used to store the values of the multiple constraint columns for the modified data row;

datatypes: this field is configured for storing value(s) that identify the datatype(s) of the column(s) of the data row to which the row-level change was applied in the source database;

old_values: this field is configured for storing the old values, for the data row being affected, that existed in the source database prior to applying the row-level change;

new_values: this field is configured for storing the new values, for the data row being affected, after the row-level change has been applied in the source database.

It is noted that the above fields are merely exemplary of the types of information that can be stored in a row-level change record, and for this reason the fields of record 210 in FIG. 2A are to be regarded in an illustrative rather than a restrictive sense.

Statement-Level Change Records

According to the techniques described herein, a statement-level change record indicates an operation that affects multiple data rows. For example, in a database table that stores employee salary data, a statement-level change would be an update operation that increases the minimal salary stored in a column named "min_salary" by 5% for all data rows in the table. Another example of a statement-level change would be a delete operation that deletes all data rows from a database table, and yet another example of a statement-level change would be an insert operation that adds multiple data rows to a database table in the source database. (It is noted that a database statement indicated in a statement-level change may read from one or more database objects and may modify one or more database objects that can be the same as, or different than, the database objects from which the database statement read. An example of such statement is the SQL "INSERT AS SELECT" statement.)

FIG. 2B is a block diagram that illustrates an example of a statement-level change record according to one embodiment. It is noted that in different embodiments and implementations a statement-level change may comprise of multiple records, and for this reason the single statement-level change record 220 in FIG. 2B is to be regarded in an illustrative rather than a restrictive sense.

In FIG. 2B, statement-level change record 220 is a data structure that stores data values in several fields. The data values in record 220 indicate an update operation that updates the "min_salary" column for all data rows in the "jobs" table (in schema "HR" of database "ORCL1") that store information for employees that are not managers.

As illustrated in FIG. 2B, statement-level change record 220 stores information about an update statement-level change in the following fields:

source_database_name: this field is configured for storing a value that identifies the source database;

command_type: this field is configured for storing a value that identifies the type of the command that is executed in the source database, where examples of command types include, without limitation, insert, update, delete, etc.;

object_owner: this field is configured for storing a value that identifies the user who owns the database object against which the statement-level change is applied;

object_name: this field is configured for storing a value that identifies the database object against which the statement-level change is applied;

object_type: this field is configured for storing a value that identifies the type of the database object against which the statement-level change is applied;

SQL_text: this field is configured for storing the text of a data manipulation language (DML) statement or a programming block that causes the statement-level change to be applied to the source database;

logon_user: this field is configured for storing a value that identifies the user whose database session initiated the statement-level change;

current_schema: this field is configured for storing a value that identifies the schema, in the source database, that stores the database object against which the statement-level change is applied;

tag: this field is configured for storing a value that identifies the change record itself and that is used to track the propagation of the change record to the destination database;

transaction_ID: this field is configured for storing a value that identifies the database transaction within which the statement-level change was applied in the source database;

initial_SCN: this field is configured for storing a system-wide control number that indicates the state of the source database at the time when the statement-level change was initiated;

commit_SCN: this field is configured for storing a system-wide control number that indicates the state of the source database at the time when the statement-level change was committed to persistent storage;

modified objects: this field is configured for storing value(s) that identify the database object(s) in the source database that were modified by the statement-level change;

bind_values: this field is configured for storing information that identifies the bind values for any parameterized variables that are included in the database statement for the statement-level change;

predicate_information: this field is configured for storing information that identifies the predicates included in the database statement for the statement-level change;

old_values_checksum: this field is configured for storing a checksum of old values that existed in the source database prior to applying the statement-level change;

rowcount: this field is configured for storing a value indicating the number of data rows that are affected by the statement-level change at the source database.

It is noted that the above fields are merely exemplary of the types of information that can be stored in a statement-level change record, and for this reason the fields of record 220 in FIG. 2B are to be regarded in an illustrative rather than a restrictive sense.

In some embodiments, a statement-level change record may include some of the same information that is included in a row-level change record (e.g., such as source database name, object name, object type, transaction ID, etc). In these embodiments, a statement-level change record may further include the text of the database statement (or programming block of a script) that caused the statement-level change to be applied at the source database as well as bind information about any bound variables included in the database statement along with the values thereof. For example, for the predicate "job_title < > @var1" of a database statement, the bind information can describe the name, the datatype, the value, the size, the position, and other details about the variable parameter "@var1"; such bind information may be used at the destination database when the database statement is parsed prior to being executed.

In some embodiments, a statement-level change record may further include conflict detection information. The conflict detection information for a statement-level change may be used at the destination database to detect whether the statement-level change, when applied at the destination database, would produce a result that is equivalent to the result produced in the source database. Examples of conflict detection information include, without limitation: a row-count value indicating the number of data rows modified at the source database by the statement-level change; and a checksum value that is computed at the source database over a set of old values that existed prior to applying the statement-level change at the source database. The checksum may be independent of the order of the database object columns affected by the statement-level change in the source database; alternatively, the statement-level change may include a list of which columns to include as part of the computation of the checksum such as, for example, a list only of the modified columns and the primary key columns. According to the techniques described herein, a replication conflict may be detected when the checksum and/or the rowcount included in a statement-level change do not match the corresponding checksum and/or rowcount that are computed for the same statement-level change at the destination database.

Procedure-Level Change Records

According to the techniques described herein, a procedure-level change record includes information that indicates a call to a stored procedure. It is noted that, when executed, a stored procedure may affect one or more data rows of a database object in a database; however, a procedure-level change is different than a row-level change because the procedure-level change indicates a particular call to a stored procedure with particular call parameters, while a row-level change indicates a particular modification to an individual data row. For example, the information in a procedure-level change record can indicate a single call to a stored procedure that updates 101 data rows in a particular database table, where the same modification to the particular database table may be reflected in 101 row-level changes that respectively indicate individual updates to the 101 data rows. (It is noted that a procedure call in a procedure-level change may invoke a stored procedure that reads from one or more database objects and may modify one or more database objects that can be the same as, or different than, the database objects from which the stored procedure read.)

FIG. 2C is a block diagram that illustrates an example of a procedure-level change record according to one embodiment. It is noted that in different embodiments and implementations a procedure-level change may comprise of multiple records, and for this reason the single procedure-level change record 230 in FIG. 2C is to be regarded in an illustrative rather than a restrictive sense.

In FIG. 2C, procedure-level change record 230 is a data structure that stores data values in several fields. The data values in record 230 indicate a call to stored procedure "add_job_history" that inserts a data row in table "job_history" (in schema "HR" of database "ORCL1") for a particular employee identified by employee ID "101".

As illustrated in FIG. 2C, procedure-level change record 230 stores information in the following fields:
  source_database_name: this field is configured for storing a value that identifies the source database;
  command_type: this field is configured for storing a value that identifies the type of the command (e.g., the "execute" command) that is executed in the source database;
  procedure_owner: this field is configured for storing a value that identifies the user who owns the stored procedure indicated in the procedure-level change;
  package_name: this field is configured for storing a value that identifies the programming package or module which includes the stored procedure indicated in the procedure-level change;
  procedure_name: this field is configured for storing a value that identifies the stored procedure indicated in the procedure-level change;
  parameter1: this field is configured for storing a value that identifies the first parameter (if any) of the call to the stored procedure that is indicated in the procedure-level change; it is noted that when a stored procedure requires multiple parameters, a procedure-level change record may include multiple such fields or multiple related records may be used to store the identifiers of the multiple parameters of the stored procedure;
  parameter1_value: this field is configured for storing the value of the first parameter (if any) in the call to the stored procedure that is indicated in the procedure-level change; it is noted that when a stored procedure call requires the values of multiple parameters, a procedure-level change record may include multiple such fields or multiple related records may be used to store the values of the multiple parameters for the stored procedure call;
  SQL_text: this field is configured for storing the text of the database statement that calls (or otherwise causes the invocation of) the stored procedure indicated in the procedure-level change;
  logon_user: this field is configured for storing a value that identifies the user whose database session initiated the procedure-level change;
  current_schema: this field is configured for storing a value that identifies the schema, in the source database, against which the procedure-level change is applied;
  tag: this field is configured for storing a value that identifies the change record itself and that is used to track the propagation of the change record to the destination database;
  transaction_ID: this field is configured for storing a value that identifies the database transaction within which the procedure-level change was applied in the source database;
  initial_SCN: this field is configured for storing a system-wide control number that indicates the state of the source database at the time when the procedure-level change was initiated;
  commit_SCN: this field is configured for storing a system-wide control number that indicates the state of the source database at the time when the procedure-level change was committed to persistent storage;
  modified objects: this field is configured for storing value(s) that identify the database object(s) in the source database that were modified by the procedure-level change;
  bind_values: this field is configured for storing information that identifies the bind values for any parameterized variables that are used in the database statement that calls the stored procedure indicated in the procedure-level change.

It is noted that the above fields are merely exemplary of the types of information that can be stored in a procedure-level change record, and for this reason the fields of record 230 in FIG. 2C are to be regarded in an illustrative rather than a restrictive sense.

In some embodiments, a procedure-level change record may include some of the same information that is included in a statement-level change record (e.g., such as source database name, SQL_text, transaction ID, etc). In these embodiments, a procedure-level change record may further include parameter information for marshalling (e.g., identifying and transferring) to the destination database the parameters of the stored procedure call indicated in the procedure-level change as well as bind information about any bound variables that are used as parameter values in the database statement that makes the call to the stored procedure. For example, a procedure-level change record may include parameter information for marshalling all arguments in the call to the stored procedure such as, for example, the procedure name, the package name, the schema name, the names of the stored procedure's input parameters and values thereof, the names of the stored procedure's output parameters and datatypes thereof, etc. The bind information in procedure-level change records (for any bound variables that are used as procedure call parameter values) is similar to the bind information used in statement-level change records.

Dependency Determination

According to the techniques described herein, after receiving a combination of row-level, statement-level, and procedure level changes at the destination database, a set of dependencies is determined between the received changes. A dependency for any particular change is information which indicates that some other change needs to be applied to the destination database (and the transaction containing the applied change needs to commit at the destination database) before the particular change is applied. Thus, the one or more dependencies determined for a particular change indicate the order in which this particular change is to be applied to destination database with respect to one or more other changes. Depending on the particular operational scenario, some changes in the combination of changes received from the destination database may not have any dependencies, and there may be multiple changes in the combination of changes that have a dependency on the same change. In some embodiments, a dependency for a particular change may also include transactional information about the relationship (e.g., such as the initial order, the commit order, etc.) between the transaction, at the source database, to which the particular change belongs and another transaction which includes another change on which the particular change depends.

During the application phase, when the received changes are applied by processing elements at the destination database in parallel, the dependencies for a particular change are checked prior to applying the particular change. If the dependencies for the particular change are satisfied (e.g., there are no other changes that need to be applied and committed before the particular change) or the particular change does not have any dependencies, then a processing element assigned to the particular change applies the particular change to the destination database. If one or more dependencies for the particular change are not satisfied (e.g., if there are one or more other changes that need to be applied before the particular change or if the transaction(s), in which these one or more changes are included, have not yet been committed to the destination database), then the processing element suspends execution, waits until the one or more dependencies are satisfied, and applies the particular change only after the other changes indicated in the one or more dependencies have been applied and committed to the destination database. In this manner, the determined dependencies allow procedure calls (indicated in procedure-level changes) and database statements (indicated in statement-level changes) to be applied at the destination database in parallel with each other and with modifications to individual data rows (which are indicated in row-level changes).

A statement-level change, as well as a procedure-level change, may read from certain database object(s) and may modify the same or different database object(s). Since two read operations on the same database object commute, the two read operations are not dependent on each other when performed as part of different changes. However, a read operation and a write operation on the same database object do not commute, and therefore a read operation performed by a database statement in a statement-level change (or a procedure call in a procedure-level change) would depend on a write operation that is performed as part of another statement-level and/or procedure-level change. Similarly, a write operation does not commute with another write operation on the same database object, and therefore a write operation performed by a database statement in a statement-level change (or a procedure call in a procedure-level change) would depend on another write operation that is performed as part of another statement-level and/or procedure-level change.

Examples of Dependency Determinations Between Changes of Different Types

In some embodiments, the dependencies between row-level changes are determined based on the primary key value(s), foreign key value(s), unique constraint(s), and/or data row identifier(s) of the affected data rows that are indicated in the row-level changes. In addition, in order to support parallel apply of a combination of row-level, statement-level, and procedure-level changes, in these embodiments the information in the row-level changes is used along with information from statement-level and procedure-level changes to determine: (1) any statement-based and/or procedure-based dependencies for the row-level changes (e.g., such as dependencies indicating that a row-level change depends on a statement-level change and/or a procedure-level change); (2) any row-based and/or procedure-based dependencies for the statement-level changes (e.g., such as dependencies indicating that a statement-level change depends on a row-level change and/or a procedure-level change) and (3) any row-based and/or statement-based dependencies for the procedure-level changes (e.g., such as dependencies indicating that a procedure-level change depends on a row-level change and/or a statement-level change).

For example, to determine whether there is a dependency between a row-level change and a statement-level change, in some embodiments the information in the row-level change (e.g., primary key value(s), foreign key value(s), unique constraint(s), data row identifier(s), source database object, schema name, etc.) is analyzed to identify the data row affected by the row-level change. Then, the information in the statement-level change (e.g., such as the predicate information, the "WHERE" clause of the statement, the bind value(s), the modified object(s), the schema name, etc.) is analyzed to determine which data rows are indicated in the predicate(s) and/or the "WHERE" clause of the statement, which other rows will be affected by the predicate(s) and/or the "WHERE" clause, the objects and schemas affected by the predicate(s) and/or the "WHERE" clause, etc. If the analysis of the information in the statement-level change indicates that the statement-level change will affect the same data row indicated in the row-level change, then a determination is made that the row-level change and the statement-level change depend on each other. The system control numbers (and possibly other information) in the row-level change and in the statement-level change are then analyzed to determine which of the row-level change and statement-level change needs to be applied first, and a dependency is assigned to the change that needs to be applied second. For example, if the commit-time system control number of the statement-level change indicates that the statement-level change was applied to the source database before the row-level change, then a dependency is associated with the row-level change, e.g., in the form of a data structure that stores the dependency information indicating that the row-level change depends on the statement-level change. If the commit-time system control number of the statement-level change indicates that the statement-level change was applied to the source database after the row-level change, then a dependency is associated with the statement-level change.

In another example, to determine whether there is a dependency between a row-level change and a procedure-level change, in some embodiments the information in the row-level change (e.g., source database object, schema name, etc.) is analyzed to identify the database object affected by the row-level change. Then, object-related information in the procedure-level change (e.g., such as the procedure name, package or module name (if any), marshaled parameter(s), modified object(s), the schema name, etc.) is analyzed to determine which database objects are affected by the procedure-level change. If the analysis of the information in the procedure-level change indicates that the procedure-level change will affect the same database object that stores the data row affected by the row-level change, then a determination is made that the row-level change and the procedure-level change depend on each other. The system control numbers (and possibly other information) in the row-level change and in the procedure-level change are then analyzed to determine which of the row-level change and procedure-level change needs to be applied first, and a dependency is assigned to the change that needs to be applied second. For example, if the commit-time system control number of the row-level change indicates that the row-level change was applied to the source database before the procedure-level change, then a dependency is associated with the procedure-level change, e.g., in the form of a data structure that stores the dependency information indicating that the procedure-level change depends on the row-level change. If the commit-time system control number of the row-level change indicates that the row-level change was applied to the source database after the procedure-level change, then a dependency is associated with the row-level change.

In another example, to determine whether there is a dependency between a statement-level change and a procedure-level change, in some embodiments the information in the statement-level change (e.g., source database object, bind value(s), modified object(s), schema name, etc.) is analyzed to identify the database object(s) affected by the statement-level change. Then, the object-related information in the procedure-level change (e.g., such as the procedure name, package or module name (if any), marshaled parameter(s), modified object(s), the schema name, etc.) is analyzed to determine which database objects are affected by the procedure-level change. If the analysis of the information in the procedure-level change indicates that the procedure-level change will affect the same database object(s) that are affected by the statement-level change, then a determination is made that the statement-level change and the procedure-level change depend on each other. The system control numbers (and possibly other information) in the statement-level change and in the procedure-level change are then analyzed to determine which of the statement-level change and procedure-level change needs to be applied first, and a dependency is assigned to the change that needs to be applied second. For example, if the commit-time system control number of the statement-level change indicates that the statement-level change was applied to the source database before the procedure-level change, then a dependency is associated with the procedure-level change to indicate that the procedure-level change depends on the statement-level change. If the commit-time system control number of the statement-level change indicates that the statement-level change was applied to the source database after the procedure-level change, then a dependency is associated with the statement-level change.

In some embodiments, the dependency determination analysis described above is performed for all changes included the set of changes received in a particular batch from the source database. That is, in these embodiments every change in the set or batch is checked for dependencies against each and every other change in the same set or batch. In other embodiments, the above analysis is performed only for specific subsets of changes included in the same set or batch received from the source database, where the specific subsets may be determined based on the types of changes (e.g., row-level, statement-level, procedure-level, etc).

Additional Dependency Information

In some embodiments, a dependency associated with a particular row-level change may include additional information which indicates whether the particular row-level change can be safely applied in view of another row-level change. For example, within a transaction or between multiple transactions, two row-level changes may be analyzed to determine whether they affect the same database table and data row therein and, if so, to determine the order in which these two row-level changes need to be applied at the destination database. The dependency, which is assigned to one of the two row-level changes, may further include information indicating the primary key value(s), foreign key value(s), and other unique constraint value(s) that must match or otherwise be satisfied before the dependent change is applied. For example, if the dependent row-level change updates a primary key value in a given data row, then the additional dependency information may indicate whether any other data rows in the same table need to be updated before this change is applied. In another example, if the dependent row-level change updates a foreign key value in a given data row, then the additional dependency information may indicate whether to first update another table which stores a column associated with the foreign key. In another example, if the dependent row-level change updates a unique constraint value in a given data row, then the additional dependency information may indicate any other updates or modifications that need to be made first so that the row-level change will not cause a constraint violation when applied.

In some embodiments, the dependency associated with a statement-level change may include additional information that indicates whether the statement-level change depends on other statement-level changes. For example, the additional dependency information for a statement-level change may include additional predicate information (e.g., predicate constants from predicates such as "state=,'CA'" or "hire_date='Jan. 7, 2011'") that is extracted by doing predicate analysis to determine whether a predicate for the statement-level change overlaps with the predicate(s) indicated in another statement-level change.

When a predicate for a statement-level change is complex (e.g., such as a predicate that calls a SQL function, a user-defined function, a stored procedure, etc.), the dependency analysis may simply conclude that there is a dependency for this statement-level change, which will guarantee that the statement-level change will be executed at the destination database in the same order with respect to other statement-level changes as the order on the source database, thereby ensuring that applying the statement-level changes at the destination database will produce the correct result. For example, a first predicate may include a call to a function that operates on one variable and a second predicate may include a call to a different function that operates on a different variable, so in this case it may be too complicated to determine whether the data rows affected by the first predicate will overlap the data rows affected by the second predicate. In this case, the predicate analysis may be performed in a conservative way by assuming there is an overlap, which results in creating a dependency that indicates (e.g., based on commit-time system control numbers) which one of the two statement-level changes that include these two predicates depends on the other. In another example, if a statement-level change indicates a modification to the data in a table and the predicate analysis does not yield a definite answer about whether this statement-level change depends on another statement-level change that affects the same table, then a dependency may be created to indicate that this statement-level change depends on the other statement-level change (provided that the other statement-level change was applied earlier to the source database).

In some embodiments, the dependency associated with a procedure-level change may include additional information that indicates dependencies to other procedure-level and statement-level changes at the table level, at the multiple table level, at the schema level, etc. Similarly to the predicate analysis for statement-level changes, the dependency analysis for procedure-level change may also be performed in a conservative way. For example, if the analysis for a particular procedure-level change cannot produce a definite result about whether some other procedure-level and/or statement-level changes need to be applied before the particular procedure-level change, then one or more dependencies may be created to indicate that the particular procedure-level change is dependent (and therefore needs to be applied after) these other procedure-level and/or statement-level changes.

Suppression of Row-Level Changes

In some embodiments, the set of changes received from the source database may include a particular statement-level change and a subset of row-level changes that indicate the modifications made to the individual data rows in the source database by the particular statement-level change. When the analysis of the received changes detects this scenario, the techniques described herein provide for suppressing the row-level changes and applying to the destination database only the particular statement-level change.

For example, in these embodiments, a log-mining component of the replication engine at the source database or at the destination database determines that the set of changes includes log markers indicating the start and the end of the particular statement-level change. Based on these markers, the log-mining component can determine that any row-level changes recorded between the markers are governed by the particular statement-level change, so therefore for replication purposes these row-level changes can be suppressed by, for example, discarding them. Further, in these embodiments suppressing row-level changes that are governed by a procedure call indicated in a procedure-level change works in a similar manner—e.g., the log-mining component determines that all row-level changes between marker "A" (the beginning of the procedure call) and marker "B" (the end of the procedure call) are governed by the procedure call, so for replication purposes these row-level changes are ignored and only the procedure-level change (e.g., only the procedure call therein) is sent or assigned for application to the destination database.

By suppressing row-level changes in favor of statement-level and/or procedure-level changes that produce equivalent results, the techniques described herein improve the replication performance at the destination database since executing a database statement or a stored procedure can be performed much faster than executing or otherwise applying separate modifications to individual data rows.

Parallel Apply of Changes at the Destination Database

According to the techniques described herein, the set of changes received from a source database are assigned to multiple processing elements that apply the set of changes to the destination database in parallel. During the parallel application, each processing element checks the dependencies associated with each change being applied and waits for these dependencies to be satisfied before applying that change to the destination database.

In some embodiments, the row-level, statement-level, and procedure-level changes received at the destination database are assembled into the same transactions in which these changes were applied at the source database. The assembled transactions are then assigned to separate processing elements that apply them to the destination database, where for each change within a transaction, the processing element assigned to apply that transaction makes a check to determine whether the dependencies of that change are satisfied and, if so, the change is applied. If the dependencies for a given change are not satisfied, the processing element is temporarily blocked until the outstanding dependencies are satisfied (which will happen when the processing elements assigned to the other transactions apply and commit their changes to the destination database).

According to the techniques described herein, any suitable inter-process communication mechanism can be used to synchronize the multiple processing elements that apply changes to the destination database in parallel. For example, in some embodiments the synchronization between the multiple processing elements may be performed by an apply coordinator process. The apply coordinator process communicates with the multiple processing elements to keep track of which changes in which transactions have been executed. The apply coordinator process also responds to requests from the processing elements with information whether the next change to be applied by a given processing element has all its dependencies in the transaction(s) executed by the other processing element(s) satisfied, thereby ensuring that the next change in any transaction is not performed unless all other changes that this change depends on have been applied and committed to the destination database.

In an example embodiment, a reader process at the destination database analyzes the set of changes received from the source database and the dependencies determined for the set of changes. The reader process then assembles the received set of changes into multiple transactions by, for example, using the transaction IDs and other information included in the changes. The reader process passes the assembled transactions to an apply coordinator process, and the apply coordinator process assigns each transaction to an available processing element. Each particular processing element takes its assigned transaction and executes the changes included therein one by one, where at each step the particular processing element makes sure that the dependencies for the change that is to be applied at this step have been satisfied. If a dependency for a given change is not satisfied, the particular processing element informs the apply coordinator process that it is waiting for the particular change indicated in the dependency to complete. Since the apply coordinator process monitors the execution progress of all processing elements, the apply coordinator process can determine when the particular change indicated in the dependency is applied by one of the other processing elements and the transaction, in which the particular change is included, has been committed to the destination database. When the apply coordinator process determines that the particular change indicated in the dependency has been applied and committed to the destination database, the apply coordinator process notifies the particular processing element that the dependency on which it has been waiting has been satisfied. In response to receiving the notification from the apply coordinator process, the particular processing element continues execution of its transaction and applies the change which has been waiting for the dependency to be satisfied.

In this manner, the techniques described herein provide a mechanism for streaming a set or batch of a combination of row-level, statement-level, and procedure-level changes from a source database to a destination database, and for executing the set or batch of changes at destination database asynchronously and in parallel. Database applications and clients, which use the source database, can send multiple changes having multiple different types in batches and do not have to wait for the application of the changes at the destination database to complete. Further, applying the changes at the destination database in parallel improves the replication performance and the efficiency of the usage of the computing resources at the destination database.

Conflict Detection During Parallel Apply

The techniques described herein provide for conflict detection for row-level and statement-level changes during the process of applying these changes to a destination database, where each processing element performs conflict detection for each of the row-level and statement-level changes that it applies. The conflict detection mechanisms described herein are used to determine whether applying a row-level or statement-level change to the destination database will produce a result that is logically equivalent to the result produced by the same row-level or statement-level change at the source database. If applying the row-level or the statement-level change to the destination database would produce a result that is not equivalent to the result in the source database, then a replication conflict is detected and the row-level or the statement-level change is not applied to the destination database until the conflict is resolved. In this manner, the techniques described herein provide for detecting and handling any divergences between the changes as applied to the source database and the changes as they are replicated to the destination database.

In an example embodiment, when a row-level or a statement-level change is applied to a source database and the change is replicated to a destination database, a conflict detection mechanism is used to ensure that this change as applied to the destination database is consistent with the way it was already applied to the source database. For example, if at the source database a row-level or a statement-level change modified a value in a particular column of a particular data row from "3" to "4", the conflict detection mechanism needs to ensure that the corresponding column in the corresponding data row in the destination database actually stores "3" before this value is modified by the change to "4". If the corresponding column of the corresponding data row in the destination database does not store "3" prior to applying the row-level or statement-level change, then there is a replication conflict that needs to be resolved either automatically (e.g., based on some replication conflict resolution rules or policies) or manually (e.g., by a database administrator) before this change can be applied to the destination database.

The techniques described herein provide for conflict detection for row-level changes. In an example embodiment, prior to applying a row-level change to a destination database, a processing element uses the information in the row-level change to determine whether the values currently stored in the data row that is to be updated at the destination database match the old values in the corresponding data row at the source database. For example, the processing element can use the information in the row-level change (e.g., such as primary key values, foreign key values, unique constraints values, etc.) to identify the data row that is to be updated in the destination database. Then, prior to applying the row-level change, the processing element can compare the current values in the identified data row to information stored in the change (e.g., such as the old values of the data row at the source database) in order to determine whether there is a replication conflict. If there is no conflict and all the dependencies of the row-level change have been satisfied, then the processing element applies the change to the destination database. Otherwise, if replication conflict is detected, the processing element needs to resolve the conflict by a suitable automatic or manual mechanism before the row-level change can be applied to the destination database.

The techniques described herein also provide for conflict detection for statement-level changes that is based on rowcount and/or checksum information that is stored in the statement-level changes.

For example, in some embodiments a conflict detection mechanism may use a checksum on the old values that existed at the source database prior to a statement-level change being applied there. In these embodiments, a replication component at the source database reads the old values in the data rows that are to be modified by a statement-level change, and computes a checksum over these old values by using any suitable checksum mechanism such as, for example, cyclical redundancy check (CRC), Adler-32, MD5, SHA-1, etc. The computed checksum is stored in the statement-level change and the change is sent to the destination database. At the destination database, just prior to applying the statement-level change, a processing element identifies the data rows that are to be modified by the statement-level change, reads the current data values in these data rows, and computes a checksum over these current data values in the same manner as was done at the source database. The processing element then compares the computed checksum to the checksum stored in the statement-level change. If the two checksums match, then the processing element proceeds to apply the statement-level change to the destination database (provided that all dependencies of the change have been satisfied.) If the two checksums do not match, the processing element determines that a replication conflict exists because the current data values in the destination database do not match the old, pre-changed values in the source database. This means that affected data rows in the source database and the corresponding data rows in the destination database are no longer in sync, and therefore applying the statement-level change to destination database may not result in modifications that are identical to the modifications already made at the source database. Thus, when a replication conflict for a statement-level change is detected, the processing element that is assigned to apply the change to the destination database needs to resolve the conflict by a suitable mechanism (e.g., by raising an error, by calling an error-handling procedure, etc.) before the change can be applied.

In another example, in some embodiments a conflict detection mechanism may use the rowcount (e.g., the number) of data rows that are affected by a statement-level change at the source database. In these embodiments, a replication component at the source database determines the rowcount of data rows that are modified or otherwise affected by the statement-level change. The determined rowcount is stored in the statement-level change and the change is sent to the destination database. After applying the statement-level change to the destination database but prior to permanently committing it, a processing element determines the rowcount of the data rows that are affected by the statement-level change at the destination database. The processing element then compares the determined rowcount to the rowcount stored in the statement-level change. If the two rowcounts match, the processing element proceeds to commit the statement-level change to the destination database (provided that all dependencies of the change have been satisfied.) If the two rowcounts do not match, the processing element determines that a replication conflict exists and rolls back the modifications made by the statement-level change to the destination database. The processing element needs to resolve the replication conflict by a suitable mechanism (e.g., by raising an error, by calling an error-handling procedure, by checking a replication policy, etc.) before the change can be applied to the destination database.

It is noted that in some embodiments, a conflict detection mechanism may use both rowcounts and checksums as described above to detect replication conflicts for a statement-level change. For example, in these embodiments, a processing element at the destination database may be configured to detect a replication conflict when either the checksum of old values or the rowcount determined for the affected data rows in the destination database do not match the corresponding checksum and rowcount that are stored in the statement-level change that is received from the source database.

Structural Description of an Example Embodiment

Figure 3:
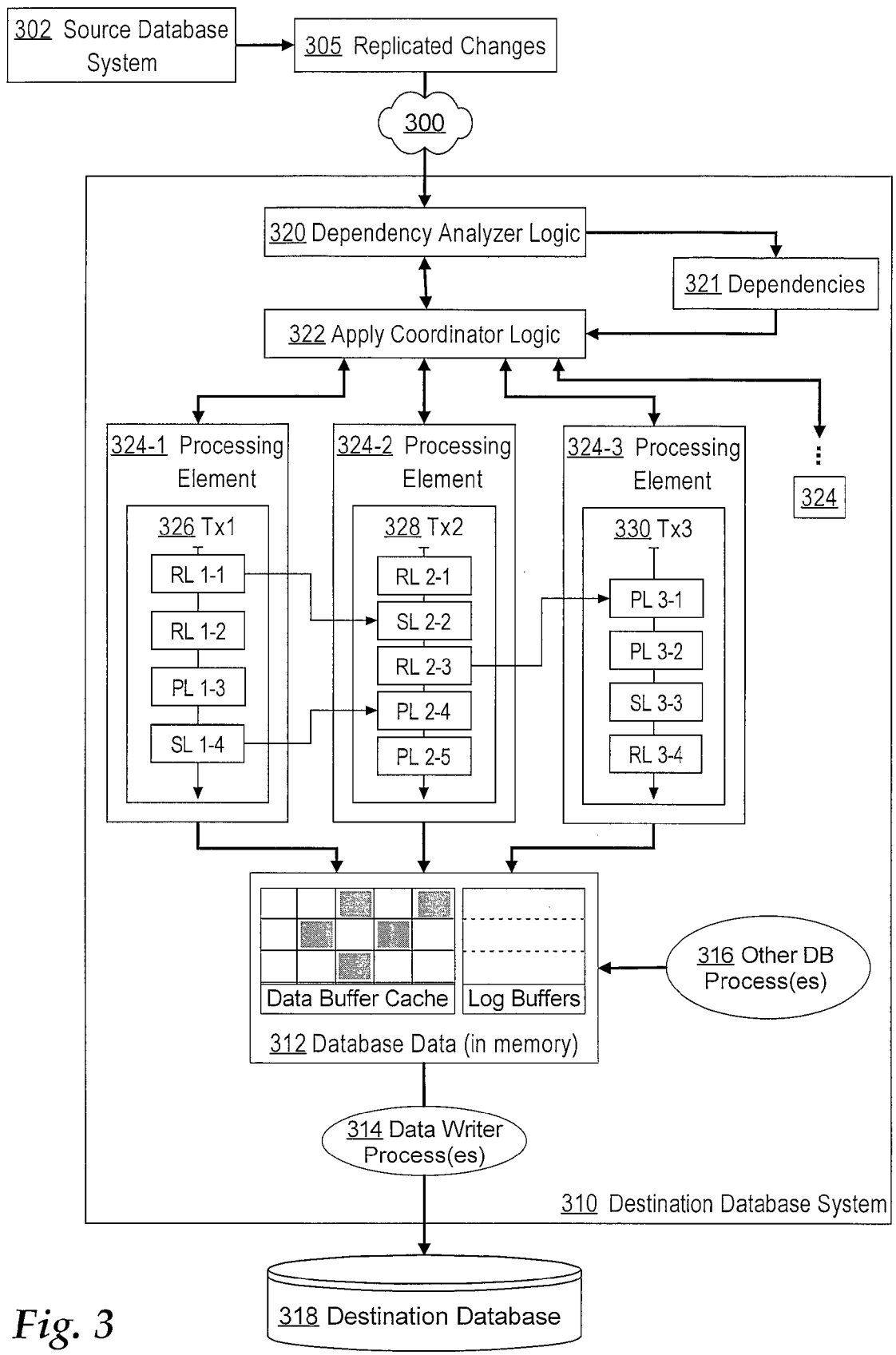
FIG. 3 is a block diagram that illustrates an example operational context according to one embodiment.

FIG. 3 is a block diagram that illustrates an operational context according to an example embodiment. Source database system 302 is communicatively connected to destination database system 310 over network 300. It is noted that in FIG. 3 the communication over network 300 is merely an example since in different deployments and operational contexts the source database system and the destination database system may use any suitable mechanisms to communicate with each other. Accordingly, the operational context illustrated in FIG. 3 is to be regarded in an illustrative rather than a restrictive sense.

In FIG. 3, source database system 302 executes on one or more computing devices, and destination database system 310 executes on one or more different computing devices.

As used herein, "database system" refers one or more software components which when executed may be allocated computational resources of a computing device, such as memory, CPU time, and/or disk storage space, in order to perform one or more functionalities against one or more databases that may include, without limitation, relational databases, object databases, object-relational databases, various kinds of XML data repositories, and any combinations thereof. (The components of a database system may also be collectively referred to as a "database server".) By utilizing its allocated resources, a database system may be configured to perform various data management functions (including, but not limited to, controlling and facilitating access to particular databases, processing requests by clients to access particular databases, and processing client-initiated operations and transactions that involve adding, deleting, and/or modifying data in particular databases), as well as database management functions (including, but not limited to, creating databases and tables, allocating disk space for databases and tables, managing memory buffers and other volatile memory allocated to databases and database-related processes, and/or creating and maintaining user login information, role information, and security policy information).

As illustrated in FIG. 3, destination database system 310 is configured to manage destination database 318. Database 318 is a collection of data that is stored on one or more persistent storage devices (not shown in FIG. 3). The collection of data comprising database 318 may be stored on the persistent storage device(s) as one or more data files that store the data of various database objects, one or more log files that store log data necessary to maintain consistent transaction processing and recovery, and one or more control and configuration files that store the control and configuration information for the database.

Destination database system 310 uses memory buffers to store and process portions of the database data and logs of database 318, such as database data 312. To manage database 318, destination database system 310 uses one or more data writer processes 314 that are configured to write the data and logs of the database to persistent storage device(s), and one or more other processes 316 that are configured to perform the various functionalities of the destination database system.

For example, data writer process(es) 314 may include: one or more database writer processes or threads that are configured to store database data 312 from the memory buffers to data files on the persistent storage device(s) that comprise database 318; one or more log writer processes that are configured to write to log files on the persistent storage device(s) redo and/or undo information that is used to maintain consistent transaction processing and recovery of database 318; and/or one or more checkpoint processes that are configured to write to the log files and/or the data files a checkpoint, which is a data structure that stores a system change number which indicates that all changes made to database data 312 prior to recording the checkpoint have been written to the persistent storage device(s).

Database process(es) 316 may include one or more server processes or threads that are allocated computational resources in order to perform functionalities such as data management functions (including, but not limited to: reading data from the persistent storage device(s) into the memory buffers when needed; and receiving requests and queries from clients and applications and processing the requests and queries by performing various operations and transactions that read, insert, delete, and modify the database data in the memory buffers) and database management functions (including, but not limited to: processing queries and requests to create databases and tables, to allocate disk space for databases and tables, and/or to create and maintain user login information, role information, and security policy information). Database process(es) 316 may include one or more processes or threads that comprise a SQL processing engine that is configured to compile, optimize, and prepare SQL statements for execution. Database process(es) 316 may also include one or more processes or threads that are configured to provide an application programming interface (API) calls to a data layer that is configured to apply changes directly to database data 312 in the memory buffers and not through the SQL processing engine.

According to the techniques described herein, destination database system 310 also includes a replication engine (not shown in FIG. 3) that comprises at least dependency analyzer logic 320 and apply coordinator logic 322. As used herein, "logic" refers to a set of executable instructions which, when executed by one or more processors in the form of one or more processes or threads, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components.

In the example operational context illustrated in FIG. 3, dependency analyzer logic 320 and apply coordinator logic 322 are implemented as one or more software modules that are part of the replication engine included in destination database system 310. Dependency analyzer logic 320 is configured to determine, in accordance with the techniques described herein, dependencies for sets of changes that are received from source database systems, such as source database system 302.

Apply coordinator logic 322 is configured to assign the received changes to processing elements 324, and to coordinate the parallel execution of the changes by the processing elements. The number of processing elements 324 in destination database system 310 may be fixed or may be dynamically set based on configuration parameters. For example, apply coordination logic 322 may be configured to spawn as many processing elements 324 (e.g., up to a configurable maximum) as may be necessary in order to take advantage of the maximum amount of parallelism that destination database system 310 can support.

In an operational example, as database operations are executed at a source database (not shown in FIG. 3) managed by source database system 302, one or more components of a replication engine at the source database system reads or otherwise captures (e.g., by mining transaction logs) the modifications made to the source database by various database sessions and transactions. A replication engine component then generates replication changes 305, where changes 305 represent the modifications made to the source database as a combination of row-level, statement-level, and procedure-level change records. Changes 305 are then propagated to destination database system 310.

A replication engine component at destination database system 310 receives changes 305 and passes them to dependency analyzer logic 320.

Dependency analyzer logic 320 analyzes changes 305 and determines that a set of dependencies 321 exists for the changes. For example, suppose that changes 305 comprise the row-level, statement-level, and procedure level changes that are included in three transactions. (For illustration purposes, in FIG. 3 row-level changes are denoted as "RL", statement-level changes are denoted as "SL", procedure-level changes are denoted as "PL", and transactions are denoted as "Tx".) Based on the analysis, dependency analyzer logic 320 determines that: the first change in the first transaction depends on the second change in the second transaction; the third change in the second transaction depends on the first change in the third transaction; and the fourth change in the first transaction depends on the fourth change in the second transaction. Thus, dependency analyzer logic 320 generates the set of dependencies 321 accordingly, and assigns the corresponding dependencies to the first and fourth changes in the first transaction and to the third change in the second transaction.

After the set of dependencies 321 is determined, apply coordinator logic 322 (and/or another replication engine component) is invoked to assemble changes 305 into transactions. For example, based on the transaction IDs included in each change, apply coordinator logic 322 (and/or the other replication component) identifies which of changes 305 belong to the first transaction Tx1, to the second transaction Tx2, and to the third transaction Tx3. Then, for each transaction, the changes belonging to that transaction are ordered based on the system change numbers (and/or other information) that are stored in each of the changes.

Apply coordinator logic 322 then assigns each of transactions Tx1, Tx2, and Tx3 to a separate processing element, where the processing elements are configured to execute in parallel to each other with synchronization provided by the apply coordinator logic. For example, apply coordinator logic 322 instantiates processing element 324-1 and assigns to it transaction 326 (Tx1), instantiates processing element 324-2 and assigns to it transaction 328 (Tx2), and instantiates processing element 324-3 and assigns to it transaction 330 (Tx3).

In the operational context of FIG. 3, each of processing elements 324-1, 324-2, and 324-3 is a background process; however, it is noted that in different embodiments and implementations, the multiple processing elements may be implemented as separate threads of a single process. Each of processing elements 324-1, 324-2, and 324-3 is assigned a transaction that includes row-level, statement-level, and procedure-level changes. Thus, each of processing elements 324-1, 324-2, and 324-3 is configured to invoke the SQL processing engine of destination database system 310 to execute database statements and procedure calls indicated in statement-level and procedure-level changes, respectively, and is also configured to make calls directly to a data layer in destination database system 310 in order to apply row-level changes directly on database data 312 that is stored in the memory buffers.

According to the techniques described herein, processing elements 324-1, 324-2, and 324-3 execute in parallel to each other their assigned transactions 326, 328, and 330, respectively. During execution, each processing element communicates with apply coordinator logic 322 when there is a need to determine whether the dependencies for a change to be applied by that processing element have been satisfied.

For example, processing element 324-1 starts executing transaction 326 (Tx1) by checking whether row-level change RL 1-1 has any dependencies. Upon determining that change RL 1-1 depends on change SL 2-2 that is assigned to processing element 324-2, processing element 324-1 suspends execution (or otherwise blocks) and sends a message to apply coordinator logic 322 requesting a notification when the dependency has been satisfied. Apply coordinator logic 322 monitors the execution by all processing elements, and therefore can determine when processing element 324-2 has applied statement-level change SL 2-2 and has committed transaction 328 (Tx2). For example, when change SL 2-2 is applied to destination database 318 and after processing element 324-2 has committed transaction 328 (Tx2), processing element 324-2 notifies apply coordinator logic 322, which in turn notifies processing element 324-1. Processing element 324-1 unblocks and performs conflict detection to determine whether a replication conflict exists for change RL 1-1. Upon determining that no replication conflict exists, processing element 324-1 applies change RL 1-1 to destination database 318 by, for example, making a call to the data layer which causes the change to be applied directly to database data 312 in the memory buffers.

Processing element 324-1 then proceeds with change RL 1-2, determines that this change does not have any dependencies and has no replication conflict, and applies this row-level change to destination database 318 by making a call to the data layer. Processing element 324-1 then proceeds with change PL 1-3, determines that this change does not have any dependencies and has no replication conflict, and applies this procedure-level change to destination database 318 by invoking a SQL processing engine component to compile the procedure call indicated in the change (e.g., based on marshaled parameter information, bind values, and other information included therein) and then executing the procedure call against the database.

After processing change PL 1-3, processing element 324-1 proceeds with statement-level change SL 1-4, and determines that this change depends on change PL 2-4 that is assigned to processing element 324-2. Upon determining that change SL 1-4 has an outstanding dependency, processing element 324-1 suspends execution (or otherwise blocks) and sends a message to apply coordinator logic 322 requesting a notification when the dependency has been satisfied. When change PL 2-4 is applied to destination database 318 and after processing element 324-2 has committed transaction 328 (Tx2), processing element 324-2 notifies apply coordinator logic 322, which in turn notifies processing element 324-1. Processing element 324-1 unblocks, determines whether change SL 1-4 has any replication conflicts by using the conflict detection mechanisms described herein, and then invokes a SQL processing engine component to compile the database statement included in the change (e.g., based on bind value and other information included therein). Processing element 324-1 then executes the database statement of change SL 1-4 against destination database 318. (It is noted that if the conflict detection mechanism used for change SL 1-4 uses rowcounts, processing element 324-1 may apply the change provisionally to obtain its rowcount, and if the obtained rowcount does not match the rowcount stored in the change the processing element may roll back transaction 326.) With this, processing element 324-1 completes the execution of transaction 326 and commits this transaction to destination database 318.

Processing element 324-2 executes its assigned transaction 328 (Tx2) in a similar manner and in parallel to the transactions executed by processing elements 324-1 and 324-3. For example, processing element 324-2 starts with row-level change RL 2-1, determines that this change does not have any dependencies and has no replication conflict, and applies this row-level change to destination database 318 by making a call to the data layer.

Processing element 324-2 then proceeds with statement-level change SL 2-2, and determines that this change does not have any dependencies. Processing element 324-2 invokes the SQL processing engine component to compile the database statement included in this change, and executes the database statement against destination database 318 (and performs rowcount-based conflict detection if necessary). After applying change SL 2-2 to destination database 318 and after transaction 328 (Tx2) has been committed, processing element 324-2 may also send a notification to apply coordinator logic 322 that this change has been applied and committed to the destination database.

Processing element 324-2 then proceeds with row-level change RL 2-3, and determines that this change depends on procedure-level change PL 3-1 that is assigned to processing element 324-3. Upon determining that change RL 2-3 has a dependency, processing element 324-2 blocks and sends a message to apply coordinator logic 322 requesting a notification when the dependency has been satisfied. Apply coordinator logic 322 inquires with processing element 324-3 whether change PL 3-1 has been applied to destination database 318 and, upon confirming that change PL 3-1 has been applied and its transaction 330 (Tx3) has been committed to the destination database, notifies processing element 324-2. Processing element 324-2 unblocks, determines whether change RL 2-3 has any replication conflicts by using the conflict detection mechanisms described herein, and then applies this row-level change to destination database 318 by making a call to the data layer.

After processing change RL 2-3, processing element 324-2 proceeds with procedure-level change PL 2-4, determines that this change does not have any dependencies, and invokes a SQL processing engine component to compile the procedure call included in the change (e.g., based on marshaled parameter information, bind values, and other information included therein). Processing element 324-2 then applies change PL 2-4 by executing the procedure call thereof against destination database 318. Then, processing element 324-2 proceeds with the last change PL 2-5 in transaction 328, determines that this change does not have any dependencies, and invokes a SQL processing engine component to compile the procedure call included in the change. Processing element 324-2 then executes the procedure call of change PL 2-5 against destination database 318, and then completes execution by committing transaction 328.

Processing element 324-3 executes its assigned transaction 330 (Tx3) in a similar manner and in parallel to the transactions executed by processing elements 324-1 and 324-2. For example, processing element 324-3 starts with procedure-level change PL 3-1, determines that this change does not have any dependencies and has no replication conflict, and applies this change to destination database 318 by invoking the SQL processing engine component to compile the procedure call indicated in the change (e.g., based on marshaled parameter information, bind values, and other information included therein) and then executing the procedure call against the database. After change PL 3-1 has been applied, processing element 324-3 proceeds with procedure-level change PL 3-2, determines that this change does not have any dependencies, and invokes a SQL processing engine component to compile the procedure call included in the change (e.g., based on marshaled parameter information, bind values, and other information included therein). Processing element 324-3 then applies change PL 3-2 by executing the procedure call thereof against destination database 318. Processing element 324-3 then proceeds with statement-level change SL 3-3, determines that this change does not have any dependencies, and invokes a SQL processing engine component to compile the database statement included in the change. Processing element 324-3 then executes the database statement of change SL 3-3 against destination database 318 (and performs rowcount-based conflict detection if necessary). Finally, processing element 324-3 proceeds with the last change RL 3-4 in transaction 330, determines that this change does not have any dependencies and has no replication conflict, and applies this row-level change to destination database 318 by making a call to the data layer. Processing element 324-3 then completes execution by committing transaction 330.

In this manner, the techniques described herein ensure that processing elements 324-1, 324-2, and 324-3 can execute their assigned transactions in parallel to each other, thereby improving the replication performance at destination database system 310 even when the replicated changes 305 include a combination of row-level, statement-level, and procedure-level changes from multiple transactions that have been executed in the source database managed by source database system 302.

Replication Extensibility for New Database Features

Due to development and testing considerations, companies that provide database system software often do not provide replication support for new database features in the same release in which support for the new database features is introduced in the database systems. For example, a database feature that is implemented in a newer database system release may not yet be supported in the replication engine because of time constraints in development or other market considerations. As a result, a newer release of the database system may support a certain database feature (e.g., such as a new datatype), but the replication engine that is responsible for replicating data associated with this database feature between database systems of the newer release may have not yet been modified accordingly. The same scenario also typically occurs for replication engine products that are developed by third parties since the third parties typically have to wait for a new version of a database system to be released before modifying their replication engine products to support the new features in the new database system release.

The techniques described herein address this problem by using statement-level changes to provide extensibility of the replication engine to new database features even when the replication engine itself does not yet natively support these features. For example, since the techniques described herein provide application of statement-level changes with conflict detection, and since the source and database systems natively support database statements that implement the new database features, the techniques described herein provide for a robust and accurate way of propagating changes related to new database features by constructing statement-level changes for data associated with the new database features.

Examples of new database features that can be supported by using statement-level changes include, without limitation, new datatypes that are introduced in database systems to natively support storage and manipulation of data having the new datatypes, and XML-related features that are frequently added to relational database systems that store XML data natively.

In an example embodiment, a replication component at a source database system is configured to detect when data, associated with a database feature that is not supported by the replication engine, needs to be replicated to a destination database system. The replication component is configured to mine database logs for modifications made to a source database. In response to determining that a modification is related to a database feature that is not natively supported by the replication engine, the replication component constructs a statement-level change regardless of the type of the modification and even when the modification is made to a data row. The statement-level change is then propagated to the destination database system, and the replication engine at the destination database system applies this statement-level change to the destination database by executing the database statement indicated in the change. It is noted that the replication engine can apply the statement-level change in this way because the destination database system natively supports the new database feature and is therefore configured to execute database statements that modify or otherwise access data associated with the new database feature.

For example, when the replication component detects that a modification is made at the source database to a data row that contains a data value having a datatype that is not natively supported by the replication engine, the replication component generates a statement-level change that indicates a SQL statement that can be executed to apply the modification at the destination database. When the statement-level change is received at the destination database, the replication database engine can compile and execute the SQL statement by using the SQL processing engine of the destination database system without having to understand the datatype and the columns in the data row that are configured for storing data having this datatype. Rather, the replication engine can simply treat the SQL statement indicated in the statement-level change like any other database statement that is propagated in a statement-level change.

Statement-Level Conflict Detection in Synchronous Replication

According to the techniques described herein, conflict detection for statement-level changes is provided for synchronous replication of changes from a source database to a destination database. As used herein, "synchronous replication" refers to replication in which changes are applied to the source database and the destination database in such way that either the changes are committed to both databases or are not committed to either database. For example, a distributed transaction may be used to cover the application of the changes to the source database, the propagation of the changes to the destination database, and the application of the changes at the destination database, so that the distributed transaction is either committed at both the source database and the destination database or is not committed at either database if an error occurs.

Figure 4:
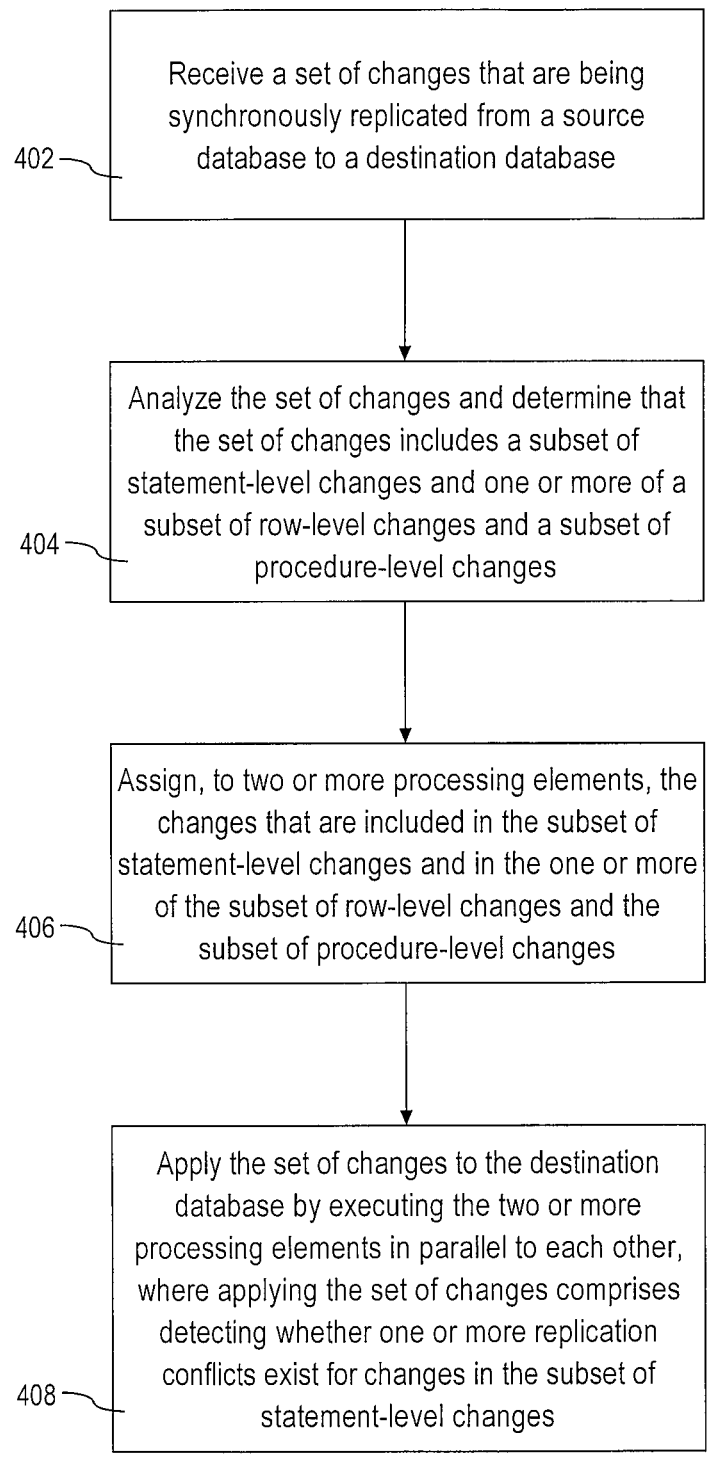
FIG. 4 is a flow diagram that illustrates an example method for synchronous database replication according to one embodiment.

FIG. 4 is a flow diagram that illustrates an example method for synchronous replication according to one embodiment. The method illustrated in FIG. 4 is described hereinafter as being performed by one or more replication engine components that are configured to apply changes to a destination database. However, it is noted that this description is for illustrative purposes only and the method of FIG. 4 is not limited to being performed by any particular type of component, process, or service.

In step 402, one or more replication components associated with a destination database receive a set of changes that are being synchronously replicated from a source database to a destination database.

In step 404, the replication component(s) associated with the destination database analyze the set of changes received from the source database, and determine that the set of changes includes a combination of a subset of statement-level changes and one or more of a subset of row-level changes and a subset of procedure-level changes.

In step 406, the replication component(s) associated with the destination database assign to two or more processing elements at least the changes that are included in the subset of statement-level changes and the one or more of the subsets of row-level changes and procedure-level changes. For example, the replication component(s) associated with the destination database may assemble two or more database transactions from the set of changes received from the source database, and may assign the two or more transactions to two or more processing elements that are configured to execute the two or more transactions against the destination database in parallel.

In step 408, the replication component(s) associated with the destination database apply the set of changes to the destination database by causing the two or more processing elements to execute in parallel to each other. The two or more processing elements are configured to apply the set of changes to the destination database synchronously with the application of these changes at the source database, thereby facilitating the synchronous replication of the changes from the source database to the destination database.

According to the techniques described herein, during the process of applying the changes to the destination database, the two or more processing elements are also configured to perform conflict detection for each statement-level change being applied. For example, each of the two or more processing elements may be assigned to apply changes of a separate transaction. While executing its assigned transaction, each processing element is configured to perform conflict detection for each statement-level change that it applies.

The processing elements may use the checksum-based and/or rowcount-based conflict detection mechanisms described herein to determine whether the synchronous replication of a statement-level change to the destination database will produce a result that is logically equivalent to the result produced by the same statement-level change at the source database. If the processing element that is applying the statement-level change to the destination database determines that the statement-level change would produce a result that is not equivalent to the result in the source database, the processing element may determine that a replication conflict exists for this change. For example, the processing element may compute a checksum and/or a rowcount for the statement-level change at the destination database, and may compare the computed checksum and/or rowcount with the checksum and/or rowcount included in the statement-level change. If there is no match for one or both, the processing element determines that a replication conflict exists for the statement-level change at the destination database.

In response to detecting a replication conflict for the statement-level change, the processing element may raise an error (e.g., by calling an appropriate error-handling procedure) and/or may cause the cancelation of the application of the statement-level change at both the source database and the destination database. In addition, or instead of, the processing element may cause the cancelation of the transaction of which the statement-level change is part of at the source database and at the destination database.

In this manner, the techniques described herein provide for detecting and handling any divergences between the changes as applied to the source database and the changes as they are synchronously replicated to the destination database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computer systems, desktop computer systems, portable computer systems, network infrastructure devices, or any other device that incorporates hard-wired and/or program logic to implement the techniques.

Figure 5:
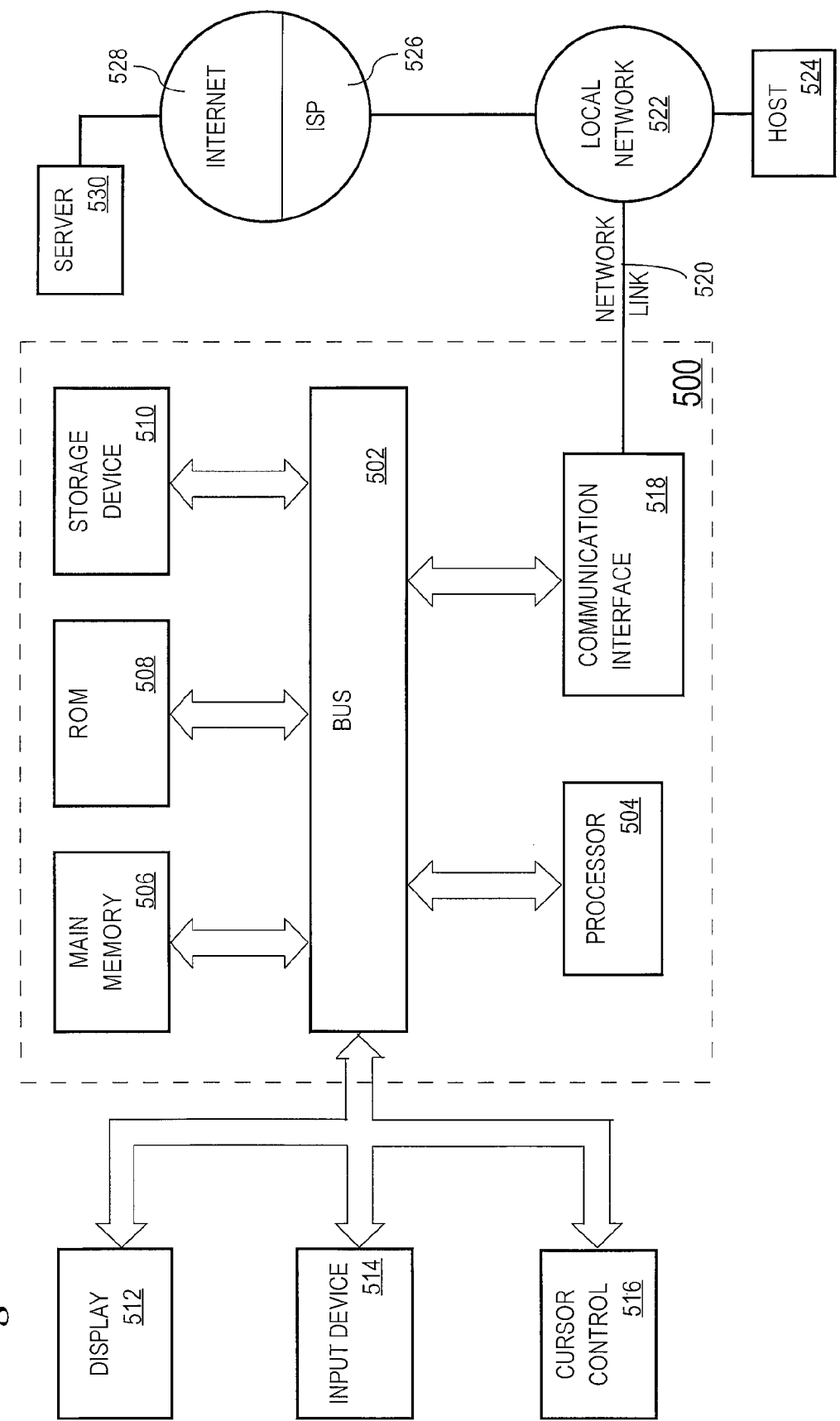
FIG. 5 is a block diagram that illustrates an example computing device on which embodiments may be implemented.

For example, FIG. 5 is a block diagram that illustrates a computer system 500 upon which an embodiment of the techniques described herein may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques for database replication described herein by using customized hard-wired logic, one or more ASICs or FPGAs, firmware and/or program logic which in combination with the computer system causes or programs computer system 500 to be a special-purpose machine. According to one embodiment, the techniques described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
   receiving a set of changes that has been applied at a source database and that is being replicated from the source database to a destination database;
   analyzing the set of changes and determining that the set of changes includes one or more of one or more statement-level changes or one or more procedure-level changes;
   wherein each statement-level change of the one or more statement-level changes affects multiple data rows;
   wherein at least one statement-level change in the one or more statement-level changes includes predicate information that is based on a predicate in a particular database statement that modified multiple data values in the source database;
   wherein each procedure-level change of the one or more procedure-level changes includes a stored procedure call,
   assigning, to two or more processing elements, changes that are included in the set of changes; and
   applying the set of changes to the destination database by executing the two or more processing elements in parallel to each other.

2. The one or more storage media of claim 1, wherein assigning the changes to the two or more processing elements comprises:
   assembling, into two or more database transactions, the changes that are included in the set of changes; and
   assigning each one of the two or more database transactions to a separate one of the two or more processing elements for execution.

3. The one or more storage media of claim 1, wherein each processing element, in the two or more processing elements, includes one of:
   one or more background processes;
   one or more threads of a particular background process.

4. The one or more storage media of claim 1, wherein the instructions, when executed by the one or more processors, further cause:
   determining a set of dependencies between changes that are included in the set of changes;
   wherein applying the set of changes is performed based on the set of dependencies.

5. The one or more storage media of claim 1, wherein the instructions, when executed by the one or more processors, further cause:
   determining that the set of changes also includes (a) one or more row-level changes, each of which affects an individual data row or (b) one or more procedure-level changes, each of which includes a stored procedure call.

6. The one or more storage media of claim 1, wherein applying the set of changes to the destination database comprises:
   detecting whether one or more replication conflicts exist for changes in the set of changes.

7. The one or more storage media of claim 1, wherein:
   the one or more statement-level changes includes a particular statement-level change that comprises one or more records that represent a database statement that modified first data values in the source database, wherein the one or more records include a first checksum that is computed based on the first data values; and applying the set of changes to the destination database comprises:

prior to applying the particular statement-level change, computing a second checksum based on second data values that are stored in the destination database and that correspond to the first data values; and detecting whether a replication conflict exists for the particular statement-level change by at least comparing the second checksum to the first checksum.

8. The one or more storage media of claim 7, wherein:

the one or more records further include a first rowcount that indicates a number of data rows, in the source database, that store the first data values; and applying the set of changes to the destination database further comprises:

prior to applying the particular statement-level change, computing a second rowcount that indicates the number of data rows, in the destination database, that store the second data values; and detecting whether the replication conflict exists for the particular statement-level change further comprises comparing the second rowcount to the first rowcount.

9. The one or more storage media of claim 1, wherein each particular change, in the set of changes, is one or more records that store information associated with particular data that was modified in the source database.

10. The one or more storage media of claim 1, wherein a second statement-level change in the one or more statement-level changes includes text of a data manipulation language (DML) statement or a programming block that causes the second statement-level change to be applied to the source database.

11. One or more storage media storing instructions which, when executed by one or more processors, cause:

receiving a set of changes that has been applied at a source database and that is being replicated from the source database to a destination database;

analyzing the set of changes and determining that the set of changes includes a plurality of statement-level changes, each of which affects multiple data rows;

wherein at least one statement-level change in the plurality of statement-level changes includes predicate information that is based on a predicate in a particular database statement that modified multiple data values in the source database;

determining a set of dependencies between changes that are included in the set of changes;

based on the set of dependencies, applying the set of changes to the destination database.

12. The one or more storage media of claim 11, wherein:

the plurality of statement-level changes includes a first statement-level change and a second statement-level change;

determining the set of dependencies between the changes includes determining a dependency between the first statement-level change and the second statement-level change.

13. The one or more storage media of claim 11, wherein:

determining the set of dependencies comprises generating a particular dependency which indicates that a first change is to be applied before a second change, wherein the particular dependency is associated with the second change; and applying the set of changes to the destination database comprises:

prior to applying the second change, determining whether the particular dependency is satisfied; and applying the second change only after determining that the particular dependency has been satisfied such that the first change has already been applied to the destination database and a transaction including the first change has already been committed at the destination database.

14. The one or more storage media of claim 11, wherein:

determining the set of dependencies comprises:

analyzing the predicate information and determining that a particular statement-level change needs to be applied after another change that is included in the set of changes; and generating a particular dependency for the particular statement-level change, wherein the particular dependency indicates that the particular statement-level change needs to be applied to the destination database after the other change and after a transaction including the other change has been committed at the destination database.

15. The one or more storage media of claim 11, wherein each particular dependency, in the set of dependencies, is information which indicates that a particular change, in the set of changes, is to be applied to the destination database after another change, of the set of changes, has already been applied to the destination database and after a transaction including the other change has been committed at the destination database.

16. The one or more storage media of claim 11, wherein the instructions, when executed by the one or more processors, further cause:

determining that the set of changes also includes (a) one or more row-level changes, each of which affects an individual data row or (b) one or more procedure-level changes, each of which includes a stored procedure call.

17. The one or more storage media of claim 11, wherein applying the set of changes to the destination database comprises:

detecting whether one or more replication conflicts exist for changes in the plurality of statement-level changes.

18. The one or more storage media of claim 11, wherein:

the plurality of statement-level changes includes a particular statement-level change that comprises one or more records that represent a database statement that modified first data values in the source database, wherein the one or more records include a first checksum that is computed based on the first data values; and applying the set of changes to the destination database comprises:

prior to applying the particular statement-level change, computing a second checksum based on second data values that are stored in the destination database and that correspond to the first data values; and detecting whether a replication conflict exists for the particular statement-level change by at least comparing the second checksum to the first checksum.

19. The one or more storage media of claim 18, wherein:

the one or more records further include a first rowcount that indicates a number of data rows, in the source database, that store the first data values; and applying the set of changes to the destination database further comprises:

prior to applying the particular statement-level change, computing a second rowcount that indicates the number of data rows, in the destination database, that store the second data values; and detecting whether the replication conflict exists for the particular statement-level change further comprises comparing the second rowcount to the first rowcount.

20. The one or more storage media of claim 11, wherein each particular change, in the set of changes, is one or more records that store information associated with particular data that was modified in the source database.

21. One or more storage media storing instructions which, when executed by one or more processors, cause:

analyzing, by a replication engine, database logs for modifications that have been made to a source database that is managed by a source database system that natively supports a particular database feature that is not supported by the replication engine;

in response to determining, by the replication engine, that a modification is related to the particular database feature, generating, by the replication engine, a statement-level change based on the modification;

wherein the statement-level change includes predicate information that is based on a predicate in a particular database statement that modified multiple data values in the source database;

causing the statement-level change to be applied to a destination database that is managed by a destination database system that natively supports the particular database feature.

22. The one or more storage media of claim 21, wherein the modification is made to a single data row.

* * * * *

UNITED STATES PATENT AND TRADEMARK OFFICE
CERTIFICATE OF CORRECTION

PATENT NO. : 9,569,514 B2  
APPLICATION NO. : 14/052531  
DATED : February 14, 2017  
INVENTOR(S) : Lu et al.

Page 1 of 1

It is certified that error appears in the above-identified patent and that said Letters Patent is hereby corrected as shown below:

In the Specification

In Column 14, Line 2, after "change)" insert -- ; --.

In Column 16, Line 24, delete ""state=,'CA'"" and insert -- "state='CA'" --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*